United States Patent [19]
Tschaeschke

[11] Patent Number: 6,000,715
[45] Date of Patent: Dec. 14, 1999

[54] MOTOR VEHICLE HEAD-PROTECTING CURTAIN

[75] Inventor: Ulrich Tschaeschke, Ehningen, Germany

[73] Assignee: DaimlerChrysler AG, Germany

[21] Appl. No.: 08/904,307

[22] Filed: Jul. 31, 1997

[30] Foreign Application Priority Data

Jul. 31, 1996 [DE] Germany ............... 196 30 854

[51] Int. Cl.⁶ .................... B60R 21/24; B60R 21/22; B60R 21/06
[52] U.S. Cl. ............ 280/730.2; 280/729; 280/730.1; 280/749
[58] Field of Search .............. 280/729, 730.1, 280/730.2, 749, 743.1

[56] References Cited

U.S. PATENT DOCUMENTS

| | | | |
|---|---|---|---|
| 5,333,898 | 8/1994 | Stutz | 280/730 |
| 5,588,672 | 12/1996 | Karlow et al. | 280/730.2 |
| 5,660,414 | 8/1997 | Karlow et al. | 280/749 |

FOREIGN PATENT DOCUMENTS

| | | |
|---|---|---|
| 36 32 877 A1 | 3/1988 | Germany . |
| 36 36 040 A1 | 4/1988 | Germany . |
| 92 11 423 | 12/1992 | Germany . |
| 42 38 427 A1 | 5/1993 | Germany . |
| 43 07 175 A1 | 9/1993 | Germany . |
| 42 32 658 A1 | 3/1994 | Germany . |
| 43 37 656 C2 | 1/1996 | Germany . |
| 61-078761 | 5/1986 | Japan . |
| 6-191365 | 7/1994 | Japan . |

*Primary Examiner*—Lanna Mai
*Assistant Examiner*—Faye M. Fleming
*Attorney, Agent, or Firm*—Evenson McKeown Edwards & Lenahan P.L.L.C.

[57] ABSTRACT

A head-protecting curtain in a motor vehicle is stored folded at the roof rail. In the event of a collision, the curtain is moved in the interior into a protecting position in front of a vehicle door, whereupon it then covers at least an upper area of the door opening and is stretched horizontally. The head-protecting curtain has at least two curtain sections that remain connected during the impact, said sections being separable from one another after the impact, starting at the bottom edge of the head-protecting curtain, along a parting line for at least part of the height.

7 Claims, 3 Drawing Sheets

MOTOR VEHICLE HEAD-PROTECTING CURTAIN

BACKGROUND AND SUMMARY OF THE INVENTION

This application claims the priority of 196 30 854.2, the disclosure of which is expressly incorporated by reference herein.

The present invention relates to a head-protecting curtain, and more particularly, to a curtain stored folded at the roof rail, and movable internally in the event of a collision into a protecting position in front of a vehicle door, said curtain then covering at least an upper area of the door opening and being stretched horizontally.

A head-protecting curtain made of tear-resistant fabric or tear-resistant film in a motor vehicle is shown in DE 43 37 656 C2. The curtain is movable under sensor control from a non-operating position in the roof area into an acting position in which it protects the head of the occupant. For this purpose, a cable is tensioned rigidly horizontally and draws the head-protecting curtain downward along the B column and therefore in front of the area of the two side door openings. In order to achieve reliable protection in an effective manner with this head-protecting curtain against an impact on the interior motor vehicle side panel, for example the window panes, this curtain must be able to be drawn down to the vicinity of the sill. However, the tightly stretched tear-resistant head-protecting curtain, as well as the cable holding the latter, poses an obstacle to rescuing the occupants after a collision. The removal of this obstacle requires the use of cutting tools for example, thereby unnecessarily consuming time until first aid can be rendered.

Another head-protecting curtain for a motor vehicle, with similar disadvantages, is also described in DE 36 32 877 A1. This curtain is pulled out in the interior as a tear-resistant film or tear-resistant capture net from the roof area and stretched over the side panel of the vehicle, and is also guided laterally in the vehicle columns.

A vehicle head-protecting curtain is described in DE 43 07 175 A1 for protecting the automobile occupant against a lateral impact. This curtain is made in the form of an airbag which unfolds from the roof rail area in a collision and then fills. The airbag remains connected with the roof rail and the window column area to prevent it from moving horizontally. Here again, following the collision of the occupant with the curtain, the head-protecting curtain located in protective fashion in front of the upper half of the door can hinder the rescue of the occupant from the vehicle through the door opening.

The following publications are mentioned here as general background on head-protecting curtains which, however, cover only a small part of the door opening: DE 42 38 427 A1, DE 42 32 658 A1, DE 36 36 040 A1, and DE 92 11 423 U1.

An object of the present invention is to improve a head-protecting curtain so that an occupant can be rescued from the vehicle in a largely unimpeded fashion.

This object has been in accordance with the present invention by providing that head-protecting curtain has at least two curtain sections that remain connected during the collision and which can be separated from one another after the collision, starting at the lower edge of head-protecting curtain, along a parting line for at least a part of the height.

In order for a head-protecting curtain mounted on the roof rail optimally to fulfill its protective function in the interior in front of a body panel in a collision, the curtain must cover the panel in the protective position and extend for a considerable distance downward from the roof rail, optimally down to the sill, and must be guided laterally if possible so that the head-protecting curtain is not pushed out of its covering position under the load imposed by the occupant.

The known head-protecting curtain, during occupant rescue after a collision, poses, however, an obstacle to its removal at each door opening, using cutting tools for example, unnecessarily consuming time until first aid can be rendered as previously noted. In the present invention, a slit that runs from the bottom edge to the top and is initially closed in the protective position allows the head-protecting curtain to be divided along the slit after the collision, preferably by hand, into two curtain sections, so that rescue of the occupant from the vehicle can begin immediately. In the same way, at least two individual curtain sections can be used that are connected with one another and can be separated from one another after the collision at their connection for at least part of the height.

The curtain sections can be connected by a sewn seam that has the property of separating continuously as the result of a pull on the free end of the sewing thread. This free end of the thread can be formed in a highly visible manner in a gripping section.

The curtain sections that are joined when the impact occurs and can be parted simply by hand after the collision can be used equally effectively in a head-protecting curtain formed by an airbag which fills upon impact and has a parting line with gas-tight edges. The parting line is located most simply in a gas-free zone between two gas chambers, with a plurality of gas chambers connected with one another to conduct gas. A plurality of such parting lines can advantageously be provided on the head-protecting curtain.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
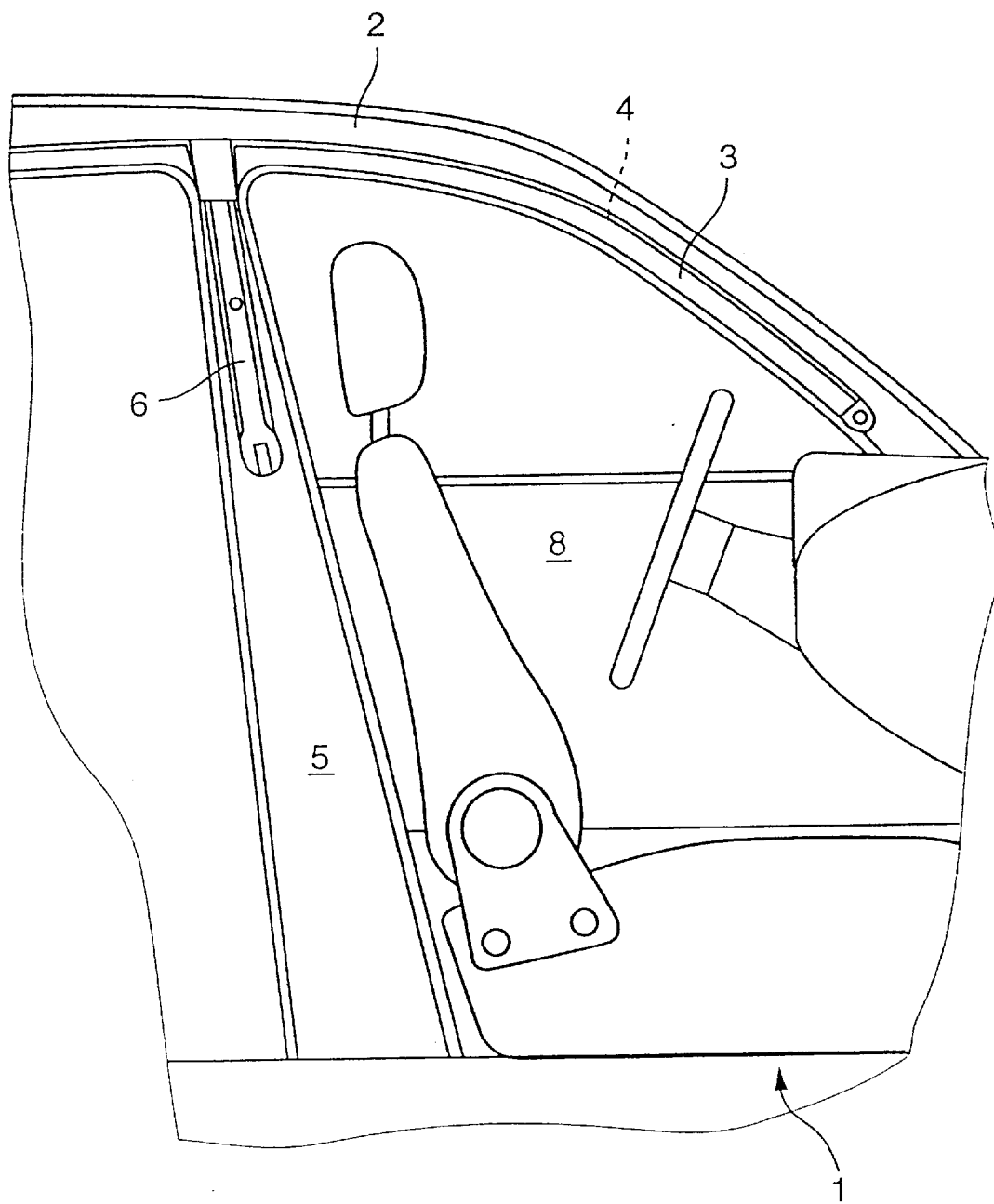
FIG. 1 is a side view of a portion of a motor vehicle, with one contemplated of a head-protecting curtain in accordance with the present invention mounted folded at the roof rail.
Figure 2:
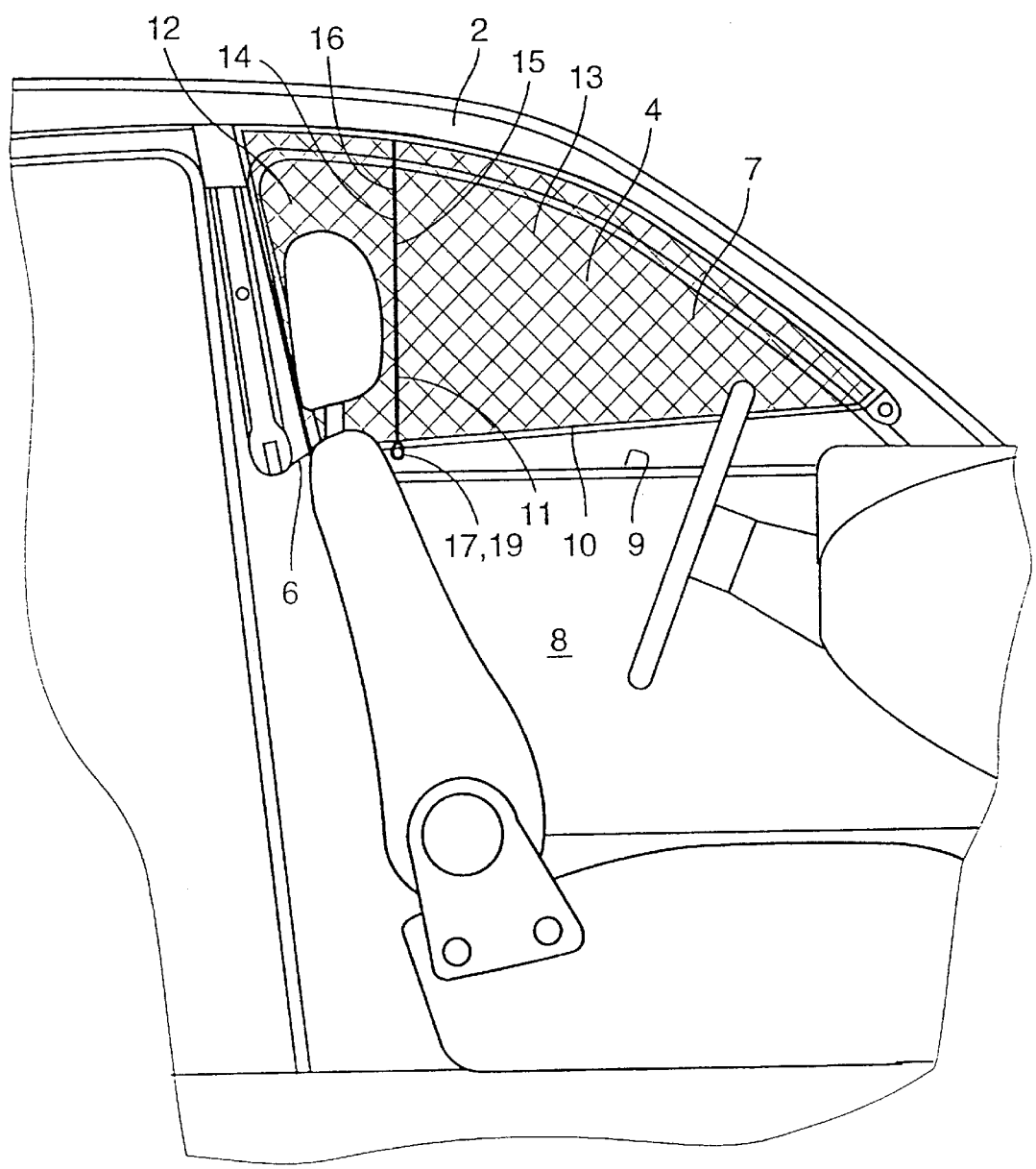
FIG. 2 is a view similar to FIG. 1 showing an embodiment of the curtain as a net-like head-protecting curtain in the protecting position.

In the motor vehicle 1 shown in FIG. 1, a head-protecting curtain 4 is folded behind a diaphragm 3 at roof rail 2. In the event of a collision, the curtain 4 is capable of being moved by a cable drive 6 mounted on B column 5 into its protecting position 7 shown in FIG. 2, in the interior in front of the glass in vehicle door 8.

In the protecting position 7, the head-protecting curtain 4 cushions an impact of the occupant against the vehicle door 8 located beside the occupant, with the head-protecting curtain 4 being moved considerably downward in the direction of sill 9 so that the occupant, even in the event of a forward tilting movement, will still strike the head-protecting curtain 4 in the lateral direction.

The head-protecting curtain 4, which then covers at least an upper area of the door opening horizontally, has a slit 11 as a parting line which runs upward from lower edge 10 and is closed. The curtain 4 can be parted manually along the slit 11 after a collision for part of its height into two curtain sections 12, 13. In this way, head-protecting curtain 4 can be parted simply and quickly when the vehicle occupant is being rescued.

Figure 4:
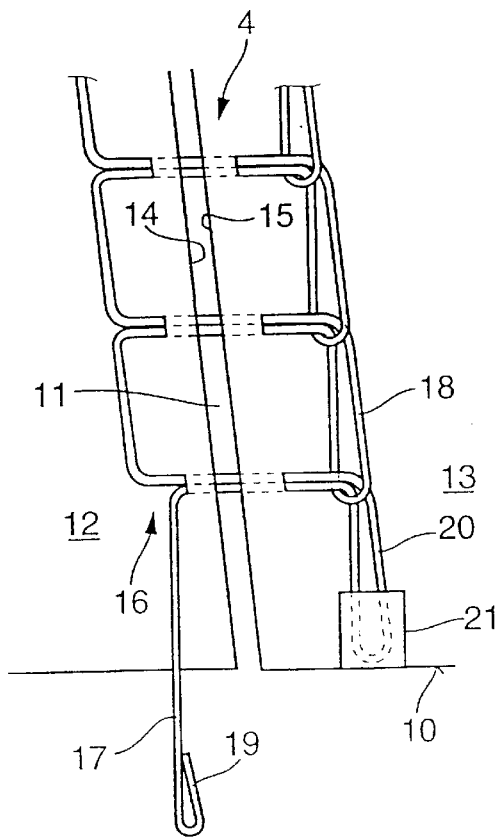
FIG. 4 is an isolated view showing one example of a contemplated sewn seam.

Because the opposite edges 14, 15 of slit 11 are intended to remain intact without yielding during the impact, whereas slit 11 nevertheless must be able to be opened easily by hand after the collision, the slit at this point is closed by a sewn seam designated generally by numeral 16 along its two edges 14, 15, as shown for example in FIG. 4. This sewn seam 16 is characterized by the fact that it is parted continuously by a pull on free end 17 of sewing thread 18 and thus breaks the connection between edges 14, 15. For this purpose, of course, other types of sewn seams are known from sewing technology and can be used here.

The free pulling end 17 of sewing thread 18, which must be pulled when rescuing the occupant after a collision, is marked in a gripping section 19 for example as a gripping loop or by a different color. The last stitch 20 of sewing thread 18 in this case is held in place by an adhesive strip 21 and thus protected against inadvertent separation, due to the retaining force of adhesive strip 21 being easily overcome.

Figure 3:
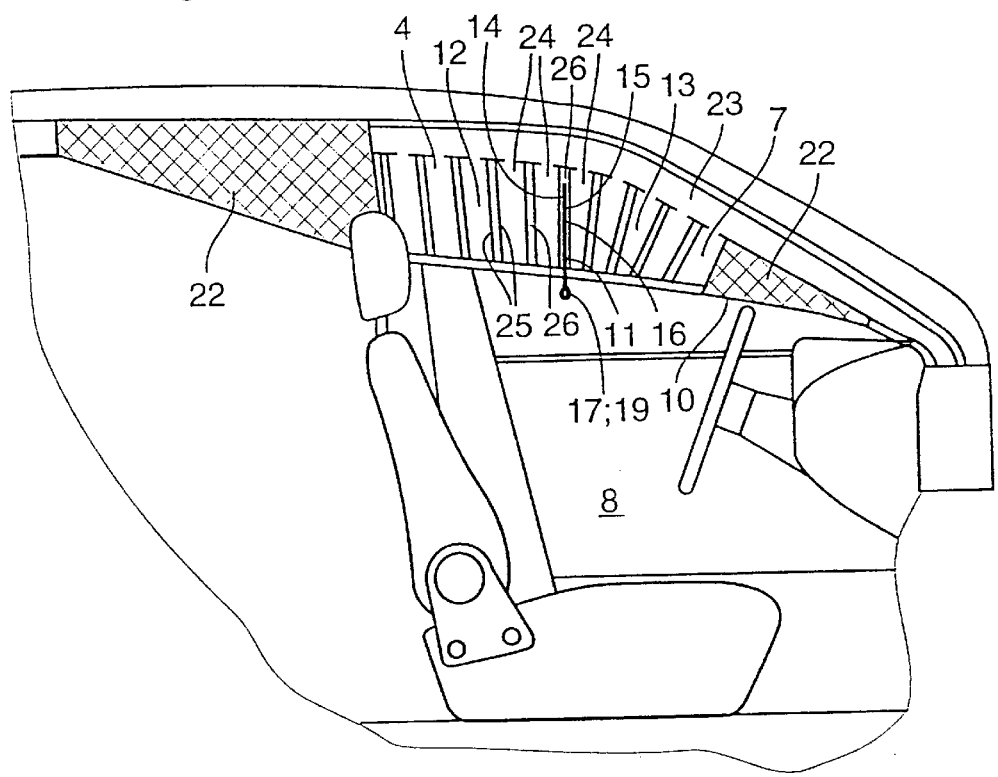
FIG. 3 is a view similar to FIG. 1 showing another embodiment of the curtain as an airbag-type head-protecting curtain in the protecting position.

FIG. 3 shows a head-protecting curtain 4 comprising an airbag 23 in the middle area between net sections 22. The airbag is unfolded from its stored position into protective position 7 in a collision and, filled with gas from a gas storage tank or gas generator, is a cushion located next to the occupant. Here again provision is made for separation along a parting line 11 into two curtain sections 12, 13 along slit 11, held together by sewn seam 16. Because airbag 23 comprises a plurality of gas chambers 24 connected with one another in a gas-conducting manner, with the chambers separated from one another by double seams 25 which hold the airbag layers together and are brought together at the upper end. Thereby, slit 11 can advantageously be made in a gas-free zone 26 between two seams 25 located close together, with edges 14, 15 of slit 11 sealed in a gas-tight manner by the seams 25.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A head-protecting curtain for use in a motor vehicle, comprising at least two curtain sections, said curtain sections having a parting line wherein said curtain sections are configured to remain connected to each other during a collision and to be separated from one another after the collision, starting at a lower edge of the head-protecting curtain, along said parting line for at least a portion of the height thereof, wherein the curtain is configured to be stored folded at a vehicle roof rail, and movable internally in the collision into a protecting position in front of a vehicle door so as to cover at least an upper area of the door.

2. The head-protecting curtain according to claim 1, wherein the connection between curtain sections is arranged to be broken manually.

3. The head-protecting curtain according to claim 1, wherein the connection of curtain sections is formed by a sewn seam which, when pulled at a free end of sewing thread of the sewn seam, is configured to separate continuously.

4. The head-protecting curtain according to claim 3, wherein a gripping section is provided in a highly visible manner at the free end of the sewing thread.

5. The head-protecting curtain according to claim 1, wherein the head-protecting curtain is configured to extend in protecting position from the roof rail to proximate a sill of the motor vehicle.

6. The head-protecting curtain according to claim 1, wherein the head-protecting curtain comprises an airbag adapted to be filled upon impact, with edges of said airbag being made gas-tight along the parting line.

7. The head-protecting curtain according to claim 6, wherein the airbag has a plurality of gas chambers connected with one another to conduct gas, and the parting line is located in a gas-free zone between two of the gas chambers.

* * * * *